United States Patent
Killian et al.

(10) Patent No.: US 6,620,896 B1
(45) Date of Patent: Sep. 16, 2003

(54) MIXED OLEFIN POLYMERIZATION CATALYSTS, PROCESSES EMPLOYING SUCH CATALYSTS, AND POLYMERS OBTAINED THEREFROM

(75) Inventors: Christopher Moore Killian, Gray, TN (US); Peter Borden Mackenzie, Kingsport, TN (US); Gino Georges Lavoie, Kingsport, TN (US); James Allen Ponasik, Jr., Kingsport, TN (US); Leslie Shane Moody, Johnson City, TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 09/255,736

(22) Filed: Feb. 23, 1999

(51) Int. Cl.⁷ .............................. C08F 4/52; C08F 4/70
(52) U.S. Cl. ................. 526/114; 526/113; 526/115; 526/117; 526/118; 526/119; 526/161; 526/172; 526/169.1; 502/117; 502/155
(58) Field of Search ................ 526/113, 115, 526/117, 118, 119, 161, 172, 114

(56) References Cited

U.S. PATENT DOCUMENTS

| | | | |
|---|---|---|---|
| 4,482,640 A | 11/1984 | Knudsen et al. | |
| 4,659,685 A | 4/1987 | Coleman, III et al. | |
| 4,689,437 A | 8/1987 | Murray | |
| 4,691,036 A | 9/1987 | Starzewski et al. | |
| 4,716,138 A | 12/1987 | Murray | |
| 4,716,205 A | 12/1987 | Klabunde | |
| 4,724,273 A | 2/1988 | Fink et al. | |
| 4,906,754 A | 3/1990 | Klabunde | |
| 5,030,606 A | 7/1991 | Klabunde | |
| 5,175,326 A | 12/1992 | Klabunde | |
| 5,198,401 A * | 3/1993 | Turner et al. ............... | 502/155 |
| 5,272,124 A | 12/1993 | Wu | |
| 5,571,881 A | 11/1996 | Goodall et al. | |
| 5,618,770 A * | 4/1997 | Dath et al. .................. | 502/107 |
| 5,714,556 A | 2/1998 | Johnson et al. | |
| 5,852,145 A | 12/1998 | McLain et al. | |
| 5,866,663 A | 2/1999 | Brookhart et al. | |
| 5,880,241 A | 3/1999 | Brookhart et al. | |
| 5,880,323 A | 3/1999 | Brookhart, III et al. | |
| 5,886,224 A | 3/1999 | Brookhart et al. | |
| 5,891,963 A | 4/1999 | Brookhart et al. ....... | 525/326.1 |
| 6,214,761 B1 * | 4/2001 | Bennett ...................... | 502/117 |
| 6,262,196 B1 * | 7/2001 | Mecking ..................... | 526/114 |
| 6,297,338 B1 * | 10/2001 | Cotts et al. .................. | 526/352 |
| 6,403,738 B1 * | 6/2002 | Johnson et al. ............. | 526/161 |
| 6,410,660 B1 * | 6/2002 | Johnson et al. ............. | 526/115 |
| 2002/0058584 A1 * | 5/2002 | Bennett et al. ............. | 502/117 |

FOREIGN PATENT DOCUMENTS

| | | |
|---|---|---|
| DE | 292 251 A5 | 7/1991 |
| EP | 0 381 495 | 8/1990 |
| EP | 416 815 A2 * | 3/1991 |
| EP | 0 454 231 A2 | 10/1991 |
| EP | 0 531 174 A2 | 3/1993 |
| JP | 9-255712 | 9/1997 |
| JP | 9-272709 | 10/1997 |
| JP | 9-272713 | 10/1997 |
| WO | WO 95/14048 | 5/1995 |
| WO | WO 96/23010 | 8/1996 |
| WO | WO 96/37522 | 11/1996 |

(List continued on next page.)

OTHER PUBLICATIONS

Mecking, S., Macromol. Rapid Comm. vol. 20, No. 3, , pp. 139–143, 1999.*

US Provisional application Ser. No. 60/117,471, filed Jan. 27, 1999.*

US Provisional application Ser. No. 60/080,018, filed Mar. 30, 1998.*

US Provisional application Ser. No. 60/079,734, filed Mar. 27, 1998.*

Schwartz, Jeffrey et al.: "Nickel–catalyzed conjugate addition of alkenylzirconium species to α,β–Unsaturated ketones", J. Am. Chem. Soc. (1980), 102(4), 1333–40, p. 1338.

Mecking, et al.: "Reactor blending with early/late transition metal catalyst combinations in ethylene polymerization", Macromolecular: Rapid Communications, vol. 20, No. 3, Mar. 1, 1999, pp. 139–143.

Claudio Pettinari et al., "Tin(IV) and organotin (IV) complexes containing mono or bidentate N–donor ligands; II. 4–Phenylimidazole derivatives. Crystal and molecular structure of (bis(4–phenylimidazole) trimethyltin(IV) chloride", Journal of Organometallic Chemistry 515 (1996) 119–130.

(List continued on next page.)

Primary Examiner—David W. Wu
Assistant Examiner—R. Rabago
(74) Attorney, Agent, or Firm—Jonathan D. Wood, Esq.; Bernard J. Graves, Jr., Esq.

(57) ABSTRACT

Mixed olefin polymerization catalysts, methods for preparing olefin polymers using the catalysts, and polymers obtained therefrom are disclosed. The mixed catalyst system comprises the combination of (a) a Group 8-10 transition metal complex of a bidentate or tridentate ligand comprising at least one nitrogen donor selected from Set 1, (b) either a Group 8-10 transition metal complex of a bidentate or tridentate ligand comprising at least one nitrogen donor selected from Set 1 or a bidentate ligand comprising a nitrogen-nitrogen donor selected from Set 2, or a Group 4 transition metal complex of a multidnentate ligand comprising at least 1 cyclopentadienyl or indenyl ring selected from Set 3 or a titanium or chromium Ziegler-Natta catalyst selected from Set 4, and optionally (c) a compound Y.

4 Claims, No Drawings

FOREIGN PATENT DOCUMENTS

| | | |
|---|---|---|
| WO | WO 96/37523 | 11/1996 |
| WO | WO 96/37528 | 11/1996 |
| WO | WO 96/37529 | 11/1996 |
| WO | WO 97/02298 | 1/1997 |
| WO | WO 97/17380 | 5/1997 |
| WO | 97/38024 | * 10/1997 |
| WO | 97/48735 | * 12/1997 |
| WO | WO 97/48736 | 12/1997 |
| WO | WO 97/48737 | 12/1997 |
| WO | WO 97/48739 | 12/1997 |
| WO | WO 97/48740 | 12/1997 |
| WO | WO 97/48742 | 12/1997 |
| WO | WO 97/48777 | 12/1997 |
| WO | WO 98/03521 | 1/1998 |
| WO | WO 98/03559 | 1/1998 |
| WO | WO 98/03617 | 1/1998 |
| WO | WO 98/27124 | 6/1998 |
| WO | WO 98/30609 | 7/1998 |
| WO | WO 98/30610 | 7/1998 |
| WO | WO 98/30612 | 7/1998 |
| WO | WO 98/37110 | 8/1998 |
| WO | WO 98/38228 | * 9/1998 |
| WO | WO 98/40374 | 9/1998 |
| WO | WO 98/40420 | 9/1998 |
| WO | WO 98/42440 | 10/1998 |
| WO | WO 98/42664 | 10/1998 |
| WO | WO 98/42665 | 10/1998 |
| WO | WO 98/45342 | 10/1998 |
| WO | WO 98/47933 | 10/1998 |
| WO | WO 98/47934 | 10/1998 |
| WO | WO 98/49208 | 11/1998 |
| WO | WO 98/56832 | 12/1998 |
| WO | WO 98/56837 | 12/1998 |
| WO | WO 98/56839 | 12/1998 |
| WO | WO 99/02472 | 1/1999 |
| WO | WO 99/05189 | 2/1999 |
| WO | WO 99/09078 | 2/1999 |
| WO | 99/50318 | * 10/1999 |

OTHER PUBLICATIONS

Peter Langer et al., "Regioselective Cyclizations of Delocalized 1,3–Amide Dianions with Oxalic Acid Dielectrophiles", *Liebigs Ann./Recueil* 1997, 2553–2561.

Jurgen Fabian, et al., "5–Ring Cycloamidines—Novel Colored Heterocycles with Unusual Properties. II [5] Molecular and Electronic Structure", *J. prakt. Chem* 339 (1997) 735–741.

Peer Fehling et al., "Ion Pairing and Cyclization on Coordinatively Bound Oxalamidines", *Cham. Ber.* 1995, 128, 405–412.

Gregory F. Schmidt et al., "Implications of Three–Center, Two–Electron M–H–C Bonding for Related Alkyl Migration Reactions: Design and Study of an Ethylene Polymerization Catalyst", *J. Am. Chem. Soc.* 1985, 1443–1444.

K.A. Ostoja Starzewski et al., "Control of the Molecular Weight of Polyethene in Syntheses with Bis(ylide)nickel Catalysts", *Agnew, Chem. Int. Ed. Engl.* 26 (1987) No. 1. p. 63–64.

Lynda K. Johnson et al., "New Pd(II)–and Ni(II)–Based Catalysts for Polymerization of Ethylene and α–Olefins", *J. Am. Chem. Soc.* 1995, 117, 6414–6415.

Marcel Peuckart et al., "A New Nickel Complex for the Oligomerization of Ethylene", *Organometallics* 1983, 2, 594–597.

Günther Wilke, "Contributions to Organo–Nickel Chemistry", *Angewandte Chemie*, International Edition in English, vol. 27, No. 1, Jan. 1988, pp. 185–206.

Christopher M. Killian et al., "Preparation of Linear α–Olefins Using Cationic Nickel (II) α–Diimine Catalysts", *Organometallics* 1997, 16, 2005–2007.

Christopher M. Killian et al., "Living Polymerization of α–Olefins Using NiII–α–Diimine Catalysts. Synthesis of New Block Polymers Based on α–Olefins", *J. Am. Chem. Soc.* 1996, 118, 11664–11665.

Stephan J. McLain et al., "Communications to the Editor, Addition Polymerization of Cyclopentene with Nickel and Palladium Catalysts", *Macromolecules* 1998, 31, 6705–6707.

Wilhelm Keim et al., "Novel Nickel–and Palladium–Complexes with Aminobis(imino)phosphorane Ligands for the Polymerization of Ethylene", *Chem. Int. Ed. Engl.* 20 (1981) No. 1, 116–117.

M. Döring, et al., "Nitrogen Derivatives of Oxalic Acid as New complexing Agents", *Z. anorg. allg. Chem.* 620 (1994) 551–560.

Volker Michael Möhring et al., "Novel Polymerization of α–Olefins with the Catalysts System Nickel/Aminobis(imino)phosphorane", *Agnew. Chem. Int. Ed. Engl.* 24 (1985) No. II, 1001–1003.

Stefan Mecking et al., "Mechanistic Studies of the Palladium–Catalyzed Copolymerization of Ethylene and α–Olefins with Methyl Acrylate", *J. Am. Chem. Soc.* 1988, 120, 888–899.

Lynda K. Johnson et al., "Copolymerization of Ethylene and Propylene with Functionalized Vinyl Monomers by Palladium(II) Catalysts", *J. Am. Chem. Soc.* 1996, 118, 267–268.

Christopher M. Killian, "Ni(II) Based Catalysts for the Polymerization and Copolymerization of Olefins: A New Generation of Polyolefins" 1996, UNC Chapel Hill PhD. Thesis.

* cited by examiner

MIXED OLEFIN POLYMERIZATION CATALYSTS, PROCESSES EMPLOYING SUCH CATALYSTS, AND POLYMERS OBTAINED THEREFROM

FIELD OF THE INVENTION

The present invention generally relates to mixed olefin polymerization catalysts, processes employing such catalysts, and polymers obtained therefrom. The novel catalysts comprise the combination of (a) a Group 8-10 transition metal complex of a first compound selected from Set 1, (b) either a Group 8-10 transition metal complex of a second compound selected from Set 1 or Set 2, or a Group 4-6 transition metal complex of Set 3 or Set 4, and optionally (c) a compound Y.

BACKGROUND OF THE INVENTION

Olefin polymers are used in a wide variety of products, from sheathing for wire and cable to film. Olefin polymers are used, for instance, in injection or compression molding applications, in extruded films or sheeting, as extrusion coatings on paper, for example, photographic paper and digital recording paper, and the like. Improvements in catalysts have made it possible to better control polymerization processes and, thus, influence the properties of the bulk material. Increasingly, efforts are being made to tune the physical properties of plastics for lightness, strength, resistance to corrosion, permeability, optical properties, and the like for particular uses. Chain length, polymer branching, and functionality have a significant impact on the physical properties of the polymer. Accordingly, novel catalysts are constantly being sought in attempts to obtain a catalytic process for polymerizing olefins which permits more efficient and better-controlled polymerization of olefins.

Conventional polyolefins are prepared by a variety of polymerization techniques, including homogeneous liquid phase, gas phase, and slurry polymerization. Certain transition metal catalysts, such as those based on titanium compounds (e.g., $TiCl_3$ or $TiCl_4$) in combination with organoaluminum cocatalysts, are used to make linear and linear low-density polyethylenes as well as poly-α-olefins such as polypropylene. These so-called "Ziegler-Natta" catalysts are quite sensitive to oxygen and are ineffective for the copolymerization of nonpolar and polar monomers.

Recent advances in non-Ziegler-Natta olefin polymerization catalysis include the following:

L. K. Johnson et al., WO 96/23010, disclose the polymerization of olefins using cationic nickel, palladium, iron, and cobalt complexes containing diimine and bisoxazoline ligands. This document also describes the polymerization of ethylene, acyclic olefins, and/or selected cyclic olefins and optionally selected unsaturated acids or esters such as acrylic acid or alkyl acrylates to provide olefin homopolymers or copolymers.

European Patent Application No. 381,495 describes the polymerization of olefins using palladium and nickel catalysts that contain selected bidentate phosphorous containing ligands.

L. K. Johnson et al., *J. Am. Chem. Soc.*, 1995, 117, 6414, describe the polymerization of olefins such as ethylene, propylene, and 1-hexene using cationic α-diimine-based nickel and palladium complexes. These catalysts are said to polymerize ethylene to high molecular weight branched polyethylene. In addition to ethylene, Pd complexes act as catalysts for the polymerization and copolymerization of olefins and methyl acrylate.

Eastman Chemical Company has recently described in a series of patent applications (WO 98/40374, WO 98/37110, WO 98/47933, and WO 98/40420) several new classes of Group 8-10 transition metal catalysts for the polymerization of olefins. Also described are several new polymer compositions derived from epoxybutene and derivatives thereof.

G. F. Schmidt et al., *J. Am. Chem. Soc.*, 1985, 107, 1443, describe a cobalt(III) cyclopentadienyl catalytic system having the structure $[C_5Me_5(L)CoCH_2CH_2\text{-}\mu\text{-}H]^+$, which provides for the "living" polymerization of ethylene.

M. Brookhart et al., *Macromolecules*, 1995, 28, 5378, disclose using such "living" catalysts in the synthesis of end-functionalized polyethylene homopolymers.

U. Klabunde, U.S. Pat. Nos. 4,906,754, 4,716,205, 5,030,606, and 5,175,326, describes the conversion of ethylene to polyethylene using anionic phosphorous, oxygen donors ligated to Ni(II). The polymerization reactions were run between 25 and 100° C. with modest yields, producing linear polyethylene having a weight-average molecular weight ranging between 8K and 350K. In addition, Klabunde describes the preparation of copolymers of ethylene and functional group containing monomers.

M. Peuckert et al., *Organomet.*, 1983, 2(5), 594, disclose the oligomerization of ethylene using phosphine/carboxylate donors ligated to Ni(II), which showed modest catalytic activity (0.14 to 1.83 TO/s). The oligomerizations were carried out at 60 to 95° C. and 10 to 80 bar ethylene in toluene to produce α-olefins.

R. E. Murray, U.S. Pat. Nos. 4,689,437 and 4,716,138, describes the oligomerization of ethylene using phosphine/sulfonate donors ligated to Ni(II). These complexes show catalyst activities approximately 15 times greater than those reported with phosphine/carboxylate analogs.

W. Keim et al., *Angew. Chem. Int. Ed. Eng.*, 1981, 20, 116, and V. M. Mohring et al., *Angew. Chem. Int. Ed. Eng.*, 1985, 24, 1001, disclose the polymerization of ethylene and the oligomerization of α-olefins with aminobis(imino)phosphorane nickel catalysts.

G. Wilke, *Angew. Chem. Int. Ed. Eng.*, 1988, 27, 185, describes a nickel allyl phosphine complex for the polymerization of ethylene.

K. A. O. Starzewski et al., *Angew. Chem. Int. Ed. Engl.* 1987, 26, 63, and U.S. Pat. No. 4,691,036, describe a series of bis(ylide) nickel complexes, used to polymerize ethylene to provide high molecular weight linear polyethylene.

WO 97/02298 discloses the polymerization of olefins using a variety of neutral N, O, P, or S donor ligands, in combination with a nickel(0) compound and an acid.

Brown et al., WO 97/17380, describe the use of Pd α-diimine catalysts for the polymerization of olefins including ethylene in the presence of air and moisture.

Fink et al., U.S. Pat. No. 4,724,273, describe the polymerization of α-olefins using aminobis(imino)phosphorane nickel catalysts and the compositions of the resulting poly (α-olefins).

Recently, Vaughan et al., WO 97/48736, Denton et al., WO 97/48742, and Sugimura et al., WO 97/38024, describe the polymerization of ethylene using silica supported α-diimine nickel catalysts.

Also recently, Canich et al., WO 97/48735, and Mecking, DE 19707236 A1, describe the use of mixed α-diimine catalysts with group IV transition metal catalysts for the polymerization of olefins. Additional recent developments are described by Sugimura et al. in JP 96-84344 and JP 96-84343, by Yorisue et al. in JP 96-70332, by McLain et al. in WO 98/03559, by Weinberg et al. in WO 9803521, and by Matsunaga et al. in WO 97/48737.

Notwithstanding these advances in non-Ziegler-Natta catalysis, there remains a need for efficient and effective Group 8-10 transition metal catalysts for effecting polymerization of olefins. In addition, there is a need for novel methods of polymerizing olefins employing such effective Group 8-10 transition metal catalysts. In particular, there remains a need for Group 8-10 transition metal olefin polymerization catalysts with both improved temperature stability and functional group compatibility. Further, there remains a need for a method of polymerizing olefins utilizing effective Group 8-10 transition metal catalysts in combination with a Lewis acid so as to obtain a catalyst that is more active and more selective.

SUMMARY OF THE INVENTION

The present invention relates to a process for the polymerization of olefins, which comprises contacting one or more olefin monomers of the formula LI:

$$RCH=CHR^5 \qquad \text{LI}$$

with a mixed catalyst system comprising (a) a Group 8-10 transition metal complex of a first compound selected from Set 1, (b) either a Group 8-10 transition metal complex of a second compound selected from Set 1 or Set 2, or a Group 4-6 transition metal complex of Set 3 or Set 4, and optionally (c) a compound Y, Set 1

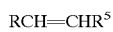

I

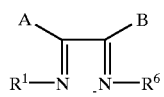

II

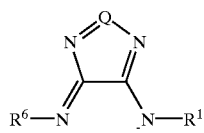

III

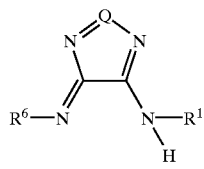

IV

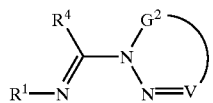

V

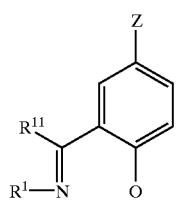

-continued

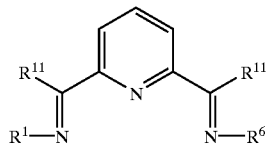

VI

Set 2

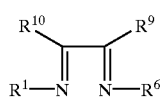

VII

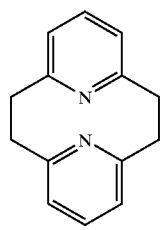

VIII

Set 3

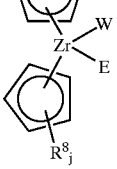

IX

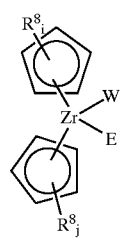

X

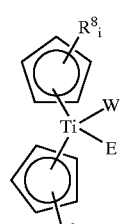

XI

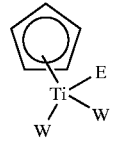

XII

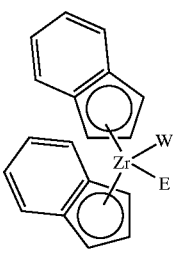

-continued

XIII
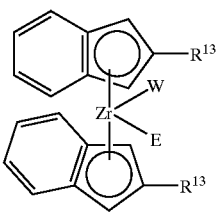

XIV
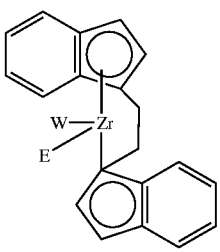

XV
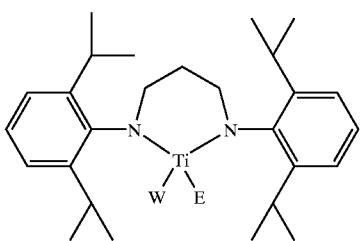

XVI
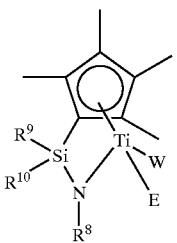

XVII
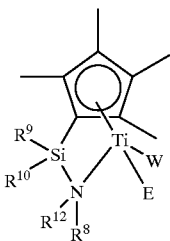

XVIII
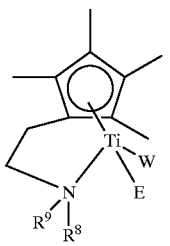

-continued

XIX
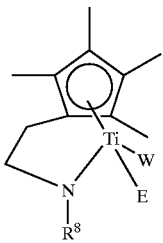

Set 4

XX

TiCl$_n$/MgCl$_2$ or Silica/R$^7$$_3$Al

XXI

Silica Supported Chromium Catalyst wherein R and R$^5$ each independently represent a hydrogen atom, a hydrocarbyl or a fluoroalkyl, and may be linked to form a cyclic olefin;

R$^1$ and R$^6$ are each independently hydrocarbyl, substituted hydrocarbyl, or silyl;

R$^7$ is hydrocarbyl;

R$^8$, R$^9$, and R$^{10}$ are each independently a hydrogen atom, hydrocarbyl, or substituted hydrocarbyl; wherein i and j are each independently a whole number from 1 to 5;

R$^{11}$ is a hydrogen atom, hydrocarbyl, substituted hydrocarbyl, heteroatom connected hydrocarbyl, heteroatom connected substituted hydrocarbyl, or silyl;

R$^{12}$ and R$^{13}$ are each independently hydrocarbyl or substituted hydrocarbyl;

E and W are each independently hydrocarbyl, chloride, bromide or iodide;

Z is a hydrogen atom, hydrocarbyl, substituted hydrocarbyl, OR$^8$, NO$_2$, or CF$_3$;

n is 3 or 4;

A and B are each independently a heteroatom connected mono-radical wherein the connected heteroatom is selected from Group 15 or 16, and wherein A and B may be linked by a bridging group;

Q is C-R$^4$, where R$^4$ is hydrocarbyl, substituted hydrocarbyl, heteroatom connected hydrocarbyl, heteroatom connected substituted hydrocarbyl, or O—Si(tert-butyl)(CH$_3$)$_2$;

G$^2$ is hydrocarbyl or substituted hydrocarbyl and may comprise a carbocyclic or heterocyclic ring, thereby forming a 5-membered or 6-membered heterocyclic ring comprising G$^2$, V, N, and N;

V is CR$^{14}$, N, or PR$^{14}$R$^{15}$; wherein R$^{14}$ and R$^{15}$ are each independently selected from H, hydrocarbyl, substituted hydrocarbyl, silyl and heteroatom connected hydrocarbyl, and wherein R$^{14}$ and R$^{15}$ may collectively form a ring with phosphorus; and Y is selected from the group consisting of a neutral Lewis acid capable of abstracting E$^-$ or W$^-$ to form a weakly coordinating anion, a cationic Lewis acid whose counterion is a weakly coordinating anion, and a Bronsted acid whose conjugate base is a weakly coordinating anion, provided that when a compound of Set 3 is part of the mixed catalyst system, a compound Y is present, and provided that when a compound of the formula VI is used, the Group 8-10 transition metal is Fe or Co.

The present invention further relates to new polyolefins that are made by the novel mixed catalyst system described herein. The polyolefins preferably contain long chain branching at greater than 0.1 long chain branches per polymer chain.

The present invention further relates to a mixed catalyst composition, which comprises (a) a Group 8-10 transition metal complex of a first compound selected from Set 1, (b) either a Group 8-10 transition metal complex of a second compound selected from Set 1 or Set 2, or a Group 4-6 transition metal complex of Set 3 or Set 4, and optionally (c) a compound Y, Set 1

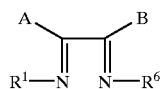

I

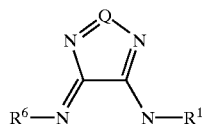

II

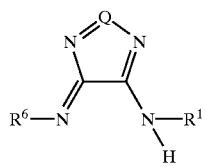

III

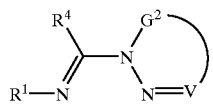

IV

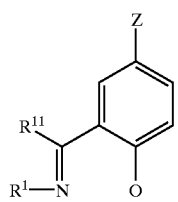

V

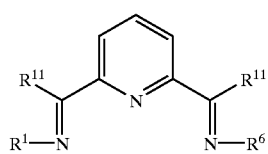

VI

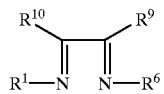

VII

Set 3

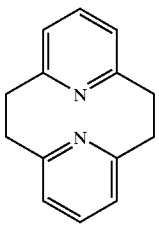

VIII

-continued

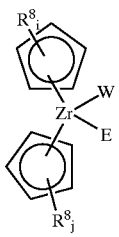

IX

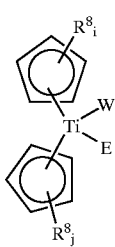

X

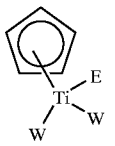

XI

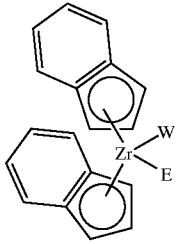

XII

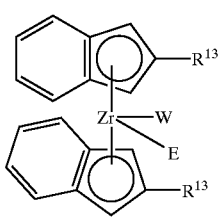

XIII

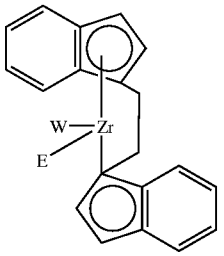

XIV

-continued

XV

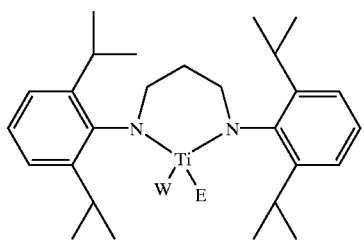

XVI

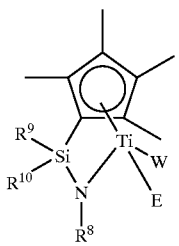

XVII

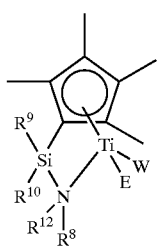

XVIII

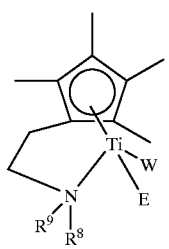

XIX

Set 4

XX

TiCl$_n$/MgCl$_2$ or Silica/R$^7$$_3$Al

XXI

Silica Supported Chromium Catalyst wherein R and R$^5$ each independently represent a hydrogen atom, a hydrocarbyl or a fluoroalkyl, and may be linked to form a cyclic olefin;

R$^1$ and R$^6$ are each independently hydrocarbyl, substituted hydrocarbyl, or silyl;

R$^7$ is hydrocarbyl;

R$^8$, R$^9$, and R$^{10}$ are each independently a hydrogen atom, hydrocarbyl, or substituted hydrocarbyl; wherein i and j are each independently a whole number from 1 to 5;

R$^{11}$ is a hydrogen atom, hydrocarbyl, substituted hydrocarbyl, heteroatom connected hydrocarbyl, heteroatom connected substituted hydrocarbyl, or silyl;

R$^{12}$ and R$^{13}$ are each independently hydrocarbyl or substituted hydrocarbyl;

E and W are each independently hydrocarbyl, chloride, bromide or iodide;

Z is a hydrogen atom, hydrocarbyl, substituted hydrocarbyl, OR$^8$, NO$_2$, or CF$_3$;

n is 3 or 4;

A and B are each independently a heteroatom connected mono-radical wherein the connected heteroatom is selected from Group 15 or 16, and wherein A and B may be linked by a bridging group;

Q is C-R$^4$, where R$^4$ is hydrocarbyl, substituted hydrocarbyl, heteroatom connected hydrocarbyl, heteroatom connected substituted hydrocarbyl, or O—Si (tert-butyl)(CH$_3$)$_2$;

G$^2$ is hydrocarbyl or substituted hydrocarbyl and may comprise a carbocyclic or heterocyclic ring, thereby forming a 5-membered or 6-membered heterocyclic ring comprising G$^2$, V, N, and N;

V is CR$^{14}$, N, or PR$^{14}$R$^{15}$; wherein R$^{14}$ and R$^{15}$ are each independently selected from H, hydrocarbyl, substituted hydrocarbyl, silyl and heteroatom connected hydrocarbyl, and wherein R$^{14}$ and R$^{15}$ may collectively form a ring with phosphorus; and Y is selected from the group consisting of a neutral Lewis acid capable of abstracting E$^-$ or W$^-$ to form a weakly coordinating anion, a cationic Lewis acid whose counterion is a weakly coordinating anion, and a Bronsted acid whose conjugate base is a weakly coordinating anion, provided that when a compound of Set 3 is part of the mixed catalyst system, a compound Y is present, and provided that when a compound of the formula VI is used, the Group 8-10 transition metal is Fe or Co.

DETAILED DESCRIPTION OF THE INVENTION

In this disclosure, certain chemical groups or compounds are described by certain terms and symbols. The terms and symbols are defined below.

Symbols ordinarily used to denote elements in the Periodic Table take their ordinary meaning, unless otherwise specified. Thus, N, O, S, P, and Si stand for nitrogen, oxygen, sulfur, phosphorus, and silicon, respectively.

Examples of neutral Lewis acids include, but are not limited to, methylaluminoxane (hereinafter "MAO") and other aluminum sesquioxides, R$^{16}$$_3$Al, R$^{16}$$_2$AlCl, R$^{16}$AlCl$_2$ (where R$^{16}$ is alkyl), organoboron compounds, boron halides, B(C$_6$F$_5$)$_3$, BPh$_3$, and B(3,5-(CF$_3$)C$_6$H$_3$)$_3$.

Examples of ionic compounds comprising a cationic Lewis acid include: R$^{17}$$_3$Sn[BF$_4$] (where R$^{17}$ is hydrocarbyl), MgCl$_2$, and H$^+$X$^-$ (where X$^-$ is a weakly coordinating anion).

The term "weakly coordinating anion" is well-known in the art per se and generally refers to a large bulky anion capable of delocalization of the negative charge of the anion. Suitable weakly coordinating anions include, but are not limited to, PF$_6$$^-$, BF$_4$$^-$, SbF$_6$$^-$, (Ph)$_4$B$^-$ wherein Ph=phenyl, and $^-$BAr$_4$ wherein $^-$BAr$_4$=tetrakis[3,5-bis(trifluoromethyl) phenyl]borate. The coordinating ability of such anions is known and described in the literature. See, e.g., S. Strauss et al., *Chem. Rev.*, 1993, 93, 927.

Examples of neutral Lewis bases include, but are not limited to, (i) ethers, for example, diethyl ether and tetrahydrofuran; (ii) organic nitriles, for example, acetonitrile; (iii) organic sulfides, for example, dimethylsulfide; and (iv) monoolefins, for example, ethylene, hexene and cyclopentene.

A "hydrocarbyl" group means a monovalent or divalent, linear, branched or cyclic group that contains only carbon and hydrogen atoms. Examples of monovalent hydrocarbyls include the following: $C_1$–$C_{20}$ alkyl; $C_1$–$C_{20}$ alkyl substituted with one or more groups selected from $C_1$–$C_{20}$ alkyl, $C_3$–$C_8$ cycloalkyl, and aryl; $C_3$–$C_8$ cycloalkyl; $C_3$–$C_8$ cycloalkyl substituted with one or more groups selected from $C_1$–$C_{20}$ alkyl, $C_3$–$C_8$ cycloalkyl, and aryl; $C_6$–$C_{14}$ aryl; and $C_6$–$C_{14}$ aryl substituted with one or more groups selected from $C_1$–$C_{20}$ alkyl, $C_3$–$C_8$ cycloalkyl, and aryl, where the term "aryl" preferably denotes a phenyl, napthyl, or anthracenyl group. Examples of divalent (bridging) hydrocarbyls include: —$CH_2$—, —$CH_2CH_2$—, —$CH_2CH_2CH_2$—, and 1,2-phenylene.

A "silyl" group refers to a $SiR_3$ group wherein Si is silicon and R is hydrocarbyl or substituted hydrocarbyl or silyl, as in $Si(SiR_3)_3$.

A "heteroatom" refers to an atom other than carbon or hydrogen. Preferred heteroatoms include oxygen, nitrogen, phosphorus, sulfur, selenium, arsenic, chlorine, bromine, silicon, and fluorine.

A "substituted hydrocarbyl" refers to a monovalent or divalent hydrocarbyl substituted with one or more heteroatoms. Examples of monovalent substituted hydrocarbyls include: 2,6-dimethyl-4-methoxyphenyl, 2,6-diisopropyl-4-methoxyphenyl, 4-cyano-2,6-dimethylphenyl, 2,6-dimethyl-4-nitrophenyl, 2,6-difluorophenyl, 2,6-dibromophenyl, 2,6-dichlorophenyl, 4-methoxycarbonyl-2,6-dimethylphenyl, 2-tert-butyl-6-chlorophenyl, 2,6-dimethyl-4-phenylsulfonylphenyl, 2,6-dimethyl-4-trifluoromethylphenyl, 2,6-dimethyl-4-trimethylammoniumphenyl (associated with a weakly coordinated anion), 2,6-dimethyl-4-hydroxyphenyl, 9-hydroxyanthr-10-yl, 2-chloronapth-1-yl, 4-methoxyphenyl, 4-nitrophenyl, 9-nitroanthr-10-yl, —$CH_2OCH_3$, cyano, trifluoromethyl, and fluoroalkyl. Examples of divalent (bridging) substituted hydrocarbyls include: 4-methoxy-1,2-phenylene, 1-methoxymethyl-1,2-ethanediyl, 1,2-bis(benzyloxymethyl)-1,2-ethanediyl, and 1-(4-methoxyphenyl)-1,2-ethanediyl.

A "heteroatom connected mono-radical" refers to a monoradical group in which a heteroatom serves as the point of attachment. Examples include: NH(2,6-dimethylphenyl) and SPh, where Ph is phenyl. Numerous other examples are given herein.

A "substituted silicon atom" refers to a —$SiR^{18}_2$— group, wherein $R^{18}$ is a hydrocarbyl or substituted hydrocarbyl.

A "substituted phosphorous atom" refers to a —P(O)($OR^{18}$)- group, wherein $R^{18}$ is a hydrocarbyl or substituted hydrocarbyl.

A "substituted sulfur atom" refers to a —S(O)—, —$SO_2$—, or —$S(NR^{18})_2$— group, wherein $R^{18}$ is a hydrocarbyl or substituted hydrocarbyl.

A "bridging group" refers to a divalent hydrocarbyl, divalent substituted hydrocarbyl, —C(O)—, —C(S)—, substituted silicon atom, substituted sulfur atom, substituted phosphorous atom, —$CH_2C(O)$—, —C(O)C(O)—, or 3,4,5,6-tetrafluoro-1,2-phenylene.

In certain cases, the bridging group, together with groups A and B, may collectively form a divalent heteroatom substituted heterocycle. Examples of such heterocycles include:

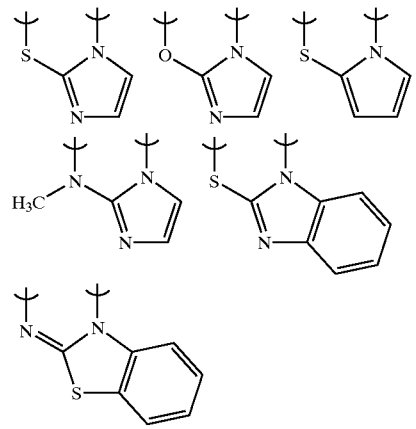

A "mono-olefin" refers to a hydrocarbon containing one carbon-carbon double bond.

The term "fluoroalkyl" as used herein refers to a $C_1$–$C_{20}$ alkyl group substituted by one or more fluorine atoms.

The term "polymer" as used herein refers to a species comprised of monomer units and having a degree of polymerization (DP) of ten or higher.

The term "α-olefin" as used herein is a 1-alkene with from 3 to 40 carbon atoms.

A "π-allyl" group refers to a monoanionic group with three $sp^2$ carbon atoms bound to a metal center in a $\eta^3$-fashion. Any of the three $sp^2$ carbon atoms may be substituted with a hydrocarbyl, substituted hydrocarbyl, heteroatom connected hydrocarbyl, heteroatom connected substituted hydrocarbyl, or O-silyl group. Examples of π-allyl groups include:

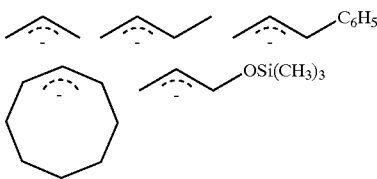

The term π-benzyl group denotes an π-allyl group where two of the $sp^2$ carbon atoms are part of an aromatic ring. Examples of 7-benzyl groups include:

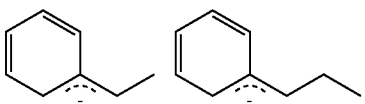

As used herein, the term "long chain branching" refers to a branch approaching the length of a polymer chain (e.g., >100 carbons).

As used herein, the terms "monomer" an d "olefin monomer" refer to the olefin or other monomer compound before it has been polymerized; the term "monomer units" refers to the moieties of a polymer that correspond to the monomers after they have been polymerized.

In some cases, a compound Y is required as a cocatalyst. Suitable compounds Y include a neutral Lewis acid capable of abstracting E⁻ or W⁻ to form a weakly coordinating anion, a cationic Lewis acid whose counterion is a weakly coordinating anion, and a Bronsted acid whose conjugate base is a weakly coordinating anion. Preferred compounds Y include: methylaluminoxane (hereinafter "MAO") and other aluminum sesquioxides, $R^{16}_3Al$, $R^{16}_2AlCl$, $R^{16}AlCl_2$ (wherein $R^{16}$ is alkyl), organoboron compounds, boron halides, $B(C_6F_5)_3$, $R^{17}_3Sn[BF_4]$ (wherein $R^1$ hydrocarbyl), $MgCl_2$, and $H^+X^-$ (wherein $X^-$ is a weakly coordinating anion). Examples of $H^+X^-$ include the ether solvate of hydrogen tetrakis[3,5-bis(trifluoromethyl)phenyl]borate and montmorillonite clay.

The relative amounts of catalyst components (a), (b), and (c) used in the mixed catalyst system of the present invention can vary over a wide range. The precise amount of each component employed depends on the desired properties and characteristics of the resulting polymer. Generally, the mixed catalyst system may contain from about 1 to about 99% by weight of component (a), from about r to about 99% by weight of component (b), and from about 10 to 10,000 molar equivalents of component (c) based on the amount of components (a) and (b).

Also described herein is a process for the polymerization of olefins. Preferred olefins include ethylene and α-olefins such as propylene, 1-butene, 1-hexene, 1-octene, and cyclic olefins such as cyclopentene.

The polymerization processes described herein may be carried out in a batch or continuous mode of operation. The processes may be conducted as solution polymerizations, as non-solvent slurry type polymerizations, as slurry polymerizations using one or more of the olefins or other solvent as the polymerization medium, or in the gas phase. The catalyst employed may be unsupported or supported using a suitable catalyst support and methods known in the art. When the catalyst is in supported form, the supported catalyst may be used in slurry or gas phase polymerizations.

Examples of "solid support" include inorganic oxide support materials, such as: talcs, silicas, titania, silica/chromia, silica/chromia/titania, silica/alumina, zirconia, aluminum phosphate gels, silanized silica, silica hydrogels, silica xerogels, silica aerogels, montmorillonite clay and silica co-gels as well as organic solid supports such as polystyrene and functionalized polystyrene. See, for example, S. B. Roscoe et al., "Polyolefin Spheres from Metallocenes Supported on Non-Interacting Polystyrene", *Science*, 1998, 280, 270–273.

An especially preferred solid support is one which has been pre-treated with compound(s) Y as described herein, most preferably with MAO. Thus, in a preferred embodiment, the catalysts of the present invention are attached to a solid support (by "attached to a solid support" is meant ion paired with a component on the surface, adsorbed to the surface or covalently attached to the surface) which has been pre-treated with a compound Y. Alternatively, the catalyst, the compound Y, and the solid support can be combined in any order, and any number of compounds Y can be utilized. In addition, the supported catalyst thus formed, may be treated with additional quantities of compound(s) Y. In an especially preferred embodiment, the catalyst components of the present invention are attached to silica which has been pre-treated with MAO. Such supported catalysts are prepared by contacting the transition metal compound, in a substantially inert solvent—by which is meant a solvent which is either unreactive under the conditions of catalyst preparation, or if reactive, acts to usefully modify the catalyst activity or selectivity—with MAO treated silica for a sufficient period of time to generate the supported catalysts. Examples of substantially inert solvents include toluene, mineral spirits, hexane, $CH_2Cl_2$ and $CHCl_3$.

Polymerization temperature and pressure have significant effects on (co)polymer structure, composition, and molecular weight. Suitable (co)polymerization temperatures preferably range from about −100° C. to about 200° C., more preferably from 20° C. to 150° C. Suitable (co) polymerization pressures preferably range from 1 atmosphere to 1000 atmospheres, and more preferably from 1 to 100 atmospheres.

After the reaction has proceeded for a time sufficient to produce the desired polymers, the polymer can be recovered from the reaction mixture by routine methods of isolation and/or purification.

High molecular weight resins are readily processed using conventional extrusion, injection molding, compression molding, and vacuum forming techniques well known in the art. Useful articles made from them include films, fibers, bottles and other containers, sheeting, molded objects and the like.

Low molecular weight resins are useful, for example, as synthetic waxes and they may be used in various wax coatings or in emulsion form. They are also particularly useful in blends with ethylene/vinyl acetate or ethylene/methyl acrylate-type copolymers in paper coating or in adhesive applications.

Although not required, typical additives used in olefin or vinyl polymers may be used in the new homopolymers and copolymers of this invention. Typical additives include pigments, colorants, titanium dioxide, carbon black, antioxidants, stabilizers, slip agents, flame retarding agents, and the like. These additives and their use in polymer systems are known per se in the art.

Other features of the invention will become apparent in the following description of working examples, which have been provided for illustration of the invention and are not intended to be limiting thereof.

EXAMPLES

Example 1

Ethylene Polymerization Using the Mixed Catalyst System Bis(indenyl) Zirconium Dimethyl and the Nickel Complex of 2.3-bis(2,6-Dimethylphenylimino)-[1.4]dithiane.

A flame dried, pear-shaped flask equipped with a stir bar and a septum was charged with 0.4 mg (1.1 μmol) of bis(indenyl)zirconium dimethyl and 0.5 mg (0.87 μmol) of the nickel dibromide complex of 2,3-bis(2,6-dimethylphenylimino)-[1,4]dithiane. The solid mixture was removed from the inert atmosphere glove box, and 50 mL of toluene and 3.0 mL of modified-MAO (Akzo Nobel) were added. The reaction was rapidly stirred at 23° C. and 1 atm ethylene for 1 minute. After 1 minute, a significant amount of polymer had precipitated, and the reaction was quenched upon addition of MeOH, acetone, and 6 M HCl. The polymer (0.5 g) was collected by suction filtration, washed with acetone and dried in vacuo for several hours. DSC: (2nd heat) melt with an endothermic maximum at 137° C. $^1$H NMR: 5 branches/1000 carbon atoms.

Example 2

Preparation of LLDPE From a Mixed Early/Late Transition Metal Catalyst System

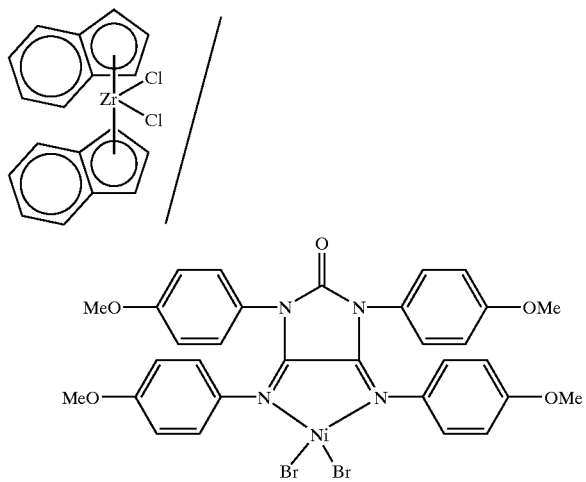

A flame dried, pear-shaped flask equipped with a stir bar and a septum was charged with 2 mg (0.87 μmol) of the nickel dibromide complex shown above. The flask was removed from the inert atmosphere glove box, and 50 mL of toluene and 3.0 mL of modified-MAO (Akzo Nobel) were added. The reaction was rapidly stirred at 25° C. and 1 atm ethylene for 15 minutes. The nickel catalyst rapidly oligomerized ethylene as indicated by the ethylene uptake in the system. After 15 minutes, 0.4 mg (1.1 μmol) of bis(indenyl) zirconium dimethyl catalyst was added, a significant amount of polymer began to precipitate, and the reaction was quenched upon addition of MeOH, acetone, and 6 M HCl after an additional 10 minutes. The polymer (0.3 g) was collected by suction filtration, washed with acetone and dried in vacuo for several hours. DSC: (2nd heat) melt with an endothermic maximum at 128° C. $^1$H NMR: 5 branches/1000 carbon atoms. GPC: Mn=57,000; Mw/Mn=1.89.

Example 3

Synthesis of the Supported Mixed Catalyst Nickel Complex of 2,3-bis(2,6-Dimethylphenylimino)-[1,4]dithiane/bis(indenyl)zirconium Dimethyl

A flame dried, pear-shaped flask equipped with a stir bar and a septum was charged with 10 mg (17 μmol) of the nickel dibromide complex of 2,3-bis(2,6-dimethylphenylimino)-[1,4]dithiane, 3 mg of bis(indenyl) zirconium dimethyl and 1 g of MAO treated silica (purchased from Witco TA 02794/HL/04). The solid mixture was cooled to 0° C. in an ice bath, and 20 mL of CH$_2$Cl$_2$ was added. The reaction was rapidly stirred at 0° C. for 1 hour. After 1 hour, the solid was allowed to settle, and the solvent was removed in vacuo. The resulting brown solid was dried under dynamic vacuum giving 983 mg of supported catalyst material.

Example 4

Polymerization of Ethylene Using the Mixed Catalyst Prepared in Example 3

A 600 mL Parr® autoclave was first heated to about 100° C. under dynamic vacuum to ensure the reactor was dry. The reactor was then purged with argon. The 600 mL Parr® autoclave was charged in the inert atmosphere glove box with 300 g of dried NaCl and 100 mg of the mixed supported catalyst prepared in Example 3. Upon removing the autoclave from the glove box, the reactor was rapidly pressurized to 200 psig ethylene. After 30 minutes at 80° C., the reaction was quenched and the polyethylene isolated by blending the polyethylene/salt mixture in warm water and collecting the resulting polymer by filtration. The polyethylene was dried for several hours in a vacuum oven at 100° C. resulting in 13.5 g of a white polyethylene. $^1$H NMR: 10 branches/1000 carbon atoms. GPC: Mn=47,800; Mw/Mn=3.99.

Example 5

Polymerization of Ethylene Using the Mixed Catalyst Prepared in Example 3

A 600 mL Parr® autoclave was first heated to about 100° C. under dynamic vacuum to ensure the reactor was dry. The reactor was then purged with argon. The 600 mL Parr® autoclave was charged in the inert atmosphere glove box with 300 g of dried NaCl and 50 mg of the mixed supported catalyst prepared in Example 3. Upon removing the autoclave from the box, the reactor was rapidly pressurized to 200 psig ethylene. After 15 minutes at 80° C., the reaction was quenched and the polyethylene isolated by blending the polyethylene/salt mixture in warm water and collecting the resulting polymer by filtration. The polyethylene was dried for several hours in a vacuum oven at 100° C. resulting in 1.5 g of a white polyethylene. $^1$H NMR: 24 branches/1000 carbon atoms. GPC: Mn=47,300; Mw/Mn=4.57.

Example 6

Polymerization of Ethylene Using the Mixed Catalyst Prepared in Example 3

A 600 mL Parr® autoclave was first heated to about 100° C. under dynamic vacuum to ensure the reactor was dry. The reactor was then purged with argon. The 600 mL Parr® autoclave was charged in the inert atmosphere glove box with 300 g of dried NaCl and 50 mg of the mixed supported catalyst prepared in Example 3. Upon removing the autoclave from the glove box, the reactor was rapidly pressurized to 200 psig ethylene. After 60 minutes at 80° C., the reaction was quenched and the polyethylene isolated by blending the polyethylene/salt mixture in warm water and collecting the resulting polymer by filtration. The polyethylene was dried for several hours in a vacuum oven at 100° C. resulting in 6.15 g of a white polyethylene. $^1$H NMR: 10 branches/1000 carbon atoms. GPC: Mn=43,600; Mw/Mn=4.11.

While the invention has been described with reference to preferred embodiments and working examples, it is to be understood that variations and modifications may be resorted to as will be apparent to those skilled in the art. Such variations and modifications are to be considered within the purview and scope of the invention as defined by the claims appended hereto.

We claim:

1. A process for the polymerization of olefins, which comprises contacting one or more olefin monomers of the formula LI:

$$RCH=CHR^5 \qquad \text{LI}$$

with a mixed catalyst system comprising (a) a Group 8-10 transition metal complex of a first compound selected from Set 1, (b) a Group 8-10 transition metal complex of a second compound selected from Set 1, and optionally (c) a compound Y, Set 1

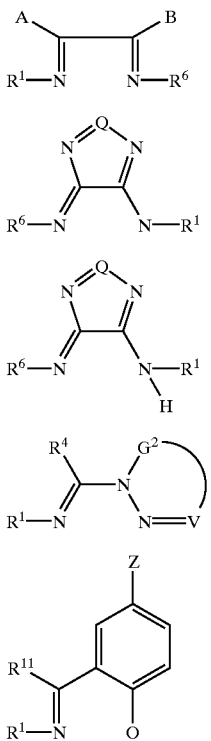

I

II

III

IV

V wherein R and $R^5$ each independently represent a hydrogen atom, a hydrocarbyl or a fluoroalkyl, and may be linked to form a cyclic olefin;

$R^1$ and $R^6$ are each independently hydrocarbyl, substituted hydrocarbyl, or silyl;

$R^{11}$ is a hydrogen atom, hydrocarbyl, substituted hydrocarbyl, heteroatom connected hydrocarbyl, heteroatom connected substituted hydrocarbyl, or silyl;

Z is a hydrogen atom, hydrocarbyl, substituted hydrocarbyl, $OR^8$, $NO_2$, or $CF_3$; n is 3 or 4;

A and B are each independently a heteroatom connected mono-radical wherein the connected heteroatom is selected from Group 15 or 16, and wherein A and B may be linked by a bridging group;

Q is C-$R^4$, where $R^4$ is hydrocarbyl, substituted hydrocarbyl, heteroatom connected hydrocarbyl, heteroatom connected substituted hydrocarbyl, or O—Si(tert-butyl)$(CH_3)_2$;

$G^2$ is hydrocarbyl or substituted hydrocarbyl and may comprise a carbocyclic or heterocyclic ring, thereby forming a 5-membered or 6-membered heterocyclic ring comprising $G^2$, V, N, and N;

V is $CR^{14}$, N, or $PR^{14}R^{15}$; wherein $R^{14}$ and $R^{15}$ are each independently selected from H, hydrocarbyl, substituted hydrocarbyl, silyl and heteroatom connected hydrocarbyl, and wherein $R^{14}$ and $R^{15}$ may collectively form a ring with phosphorus; and Y is selected from the group consisting of a neutral Lewis acid capable of forming a weakly coordinating anion, a cationic Lewis acid whose counterion is a weakly coordinating anion, and a Bronsted acid whose conjugate base is a weakly coordinating anion.

2. The process according to claim 1, wherein at least one of the transition metals in the mixed catalyst system is nickel.

3. The process according to claim 1, wherein the mixed catalyst system is on a solid support.

4. The process according to claim 3, wherein the solid support is silica.

* * * * *